United States Patent
Kim et al.

(10) Patent No.: US 10,993,266 B2
(45) Date of Patent: Apr. 27, 2021

(54) METHOD FOR PERFORMING RANDOM ACCESS IN WIRELESS COMMUNICATION SYSTEM AND DEVICE FOR SUPPORTING SAME

(71) Applicant: LG ELECTRONICS INC., Seoul (KR)

(72) Inventors: Kyuseok Kim, Seoul (KR); Kilborn Lee, Seoul (KR); Kijun Kim, Seoul (KR); Ilmu Byun, Seoul (KR); Daesung Hwang, Seoul (KR); Minki Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/097,201

(22) PCT Filed: Apr. 27, 2017

(86) PCT No.: PCT/KR2017/004518
§ 371 (c)(1),
(2) Date: Oct. 26, 2018

(87) PCT Pub. No.: WO2017/188763
PCT Pub. Date: Nov. 2, 2017

(65) Prior Publication Data
US 2019/0141752 A1    May 9, 2019

Related U.S. Application Data

(60) Provisional application No. 62/328,593, filed on Apr. 27, 2016.

(51) Int. Cl.
*H04W 74/08* (2009.01)
*H04W 56/00* (2009.01)
(Continued)

(52) U.S. Cl.
CPC ...... *H04W 74/0833* (2013.01); *H04B 7/0408* (2013.01); *H04B 7/0617* (2013.01);
(Continued)

(58) Field of Classification Search
CPC ............ H04B 7/0617; H04W 74/0833; H04W 88/02; H04W 88/08; H04W 72/042; H04L 5/0007
See application file for complete search history.

(56) References Cited

U.S. PATENT DOCUMENTS

2014/0376466 A1* 12/2014 Jeong ............... H04W 74/0833
370/329
2015/0312887 A1* 10/2015 Xia ..................... H04W 72/005
370/329
(Continued)

FOREIGN PATENT DOCUMENTS

KR    20090086993    8/2009
KR    20150000304    1/2015
(Continued)

OTHER PUBLICATIONS

PCT International Application No. PCT/KR2017/004518, International Search Report dated Aug. 4, 2017, 3 pages.

*Primary Examiner* — Mansour Oveissi
(74) *Attorney, Agent, or Firm* — Lee Hong Degerman Kang & Waimey

(57) ABSTRACT

The present invention relates to a method for user equipment to perform random access in a wireless communication system and a device therefor. The present invention can provide a method and device which: select a predetermined preamble among multiple preamble sets configured according to predetermined conditions; repeatedly transmit the selected predetermined preamble to a base station via one or multiple mutually different neighboring beams; and receive, from the base station and in response to the preamble, a
(Continued)

(a)

(b)

response message containing a temporary identifier of user equipment, wherein the selected predetermined preamble is repeatedly transmitted on resources which constitute a subframe and are distinguished according to the one or multiple mutually different beams.

10 Claims, 15 Drawing Sheets

(51) Int. Cl.
| | |
|---|---|
| *H04B 7/0408* | (2017.01) |
| *H04W 76/11* | (2018.01) |
| *H04B 7/06* | (2006.01) |
| *H04W 16/28* | (2009.01) |
| *H04W 72/04* | (2009.01) |
| *H04W 88/02* | (2009.01) |
| *H04B 7/0404* | (2017.01) |

(52) U.S. Cl.
CPC ........... *H04W 16/28* (2013.01); *H04W 56/00* (2013.01); *H04W 56/001* (2013.01); *H04W 72/046* (2013.01); *H04W 72/0446* (2013.01); *H04W 74/0891* (2013.01); *H04W 76/11* (2018.02); *H04W 88/023* (2013.01); *H04B 7/0404* (2013.01)

(56) References Cited

U.S. PATENT DOCUMENTS

| | | | |
|---|---|---|---|
| 2016/0212631 A1* | 7/2016 | Shen | H04W 56/001 |
| 2017/0094688 A1* | 3/2017 | Lee | H04W 48/12 |
| 2017/0251460 A1* | 8/2017 | Agiwal | H04W 72/0406 |
| 2018/0235013 A1* | 8/2018 | Jung | H04W 52/50 |

FOREIGN PATENT DOCUMENTS

| | | |
|---|---|---|
| KR | 20150042689 | 4/2015 |
| KR | 20160030252 | 3/2016 |
| WO | 20156110211 | 7/2015 |

* cited by examiner

[Figure 1]
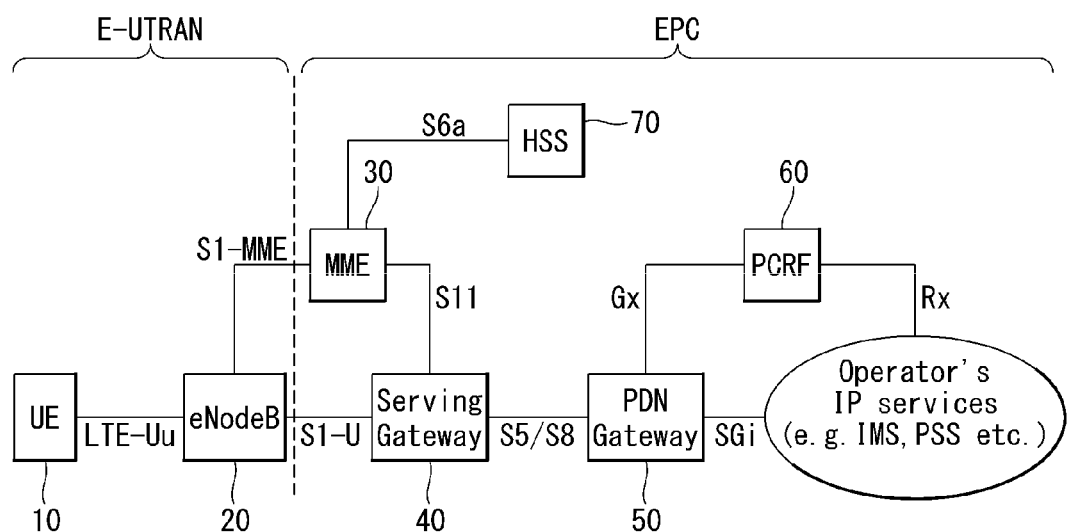

[Figure 2]
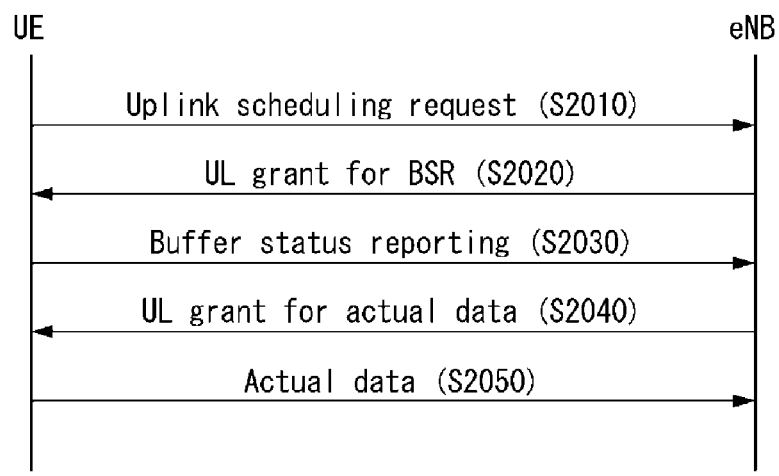
(a)
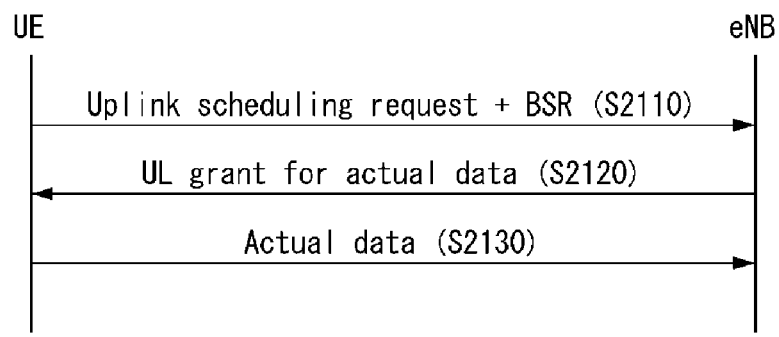
(b)

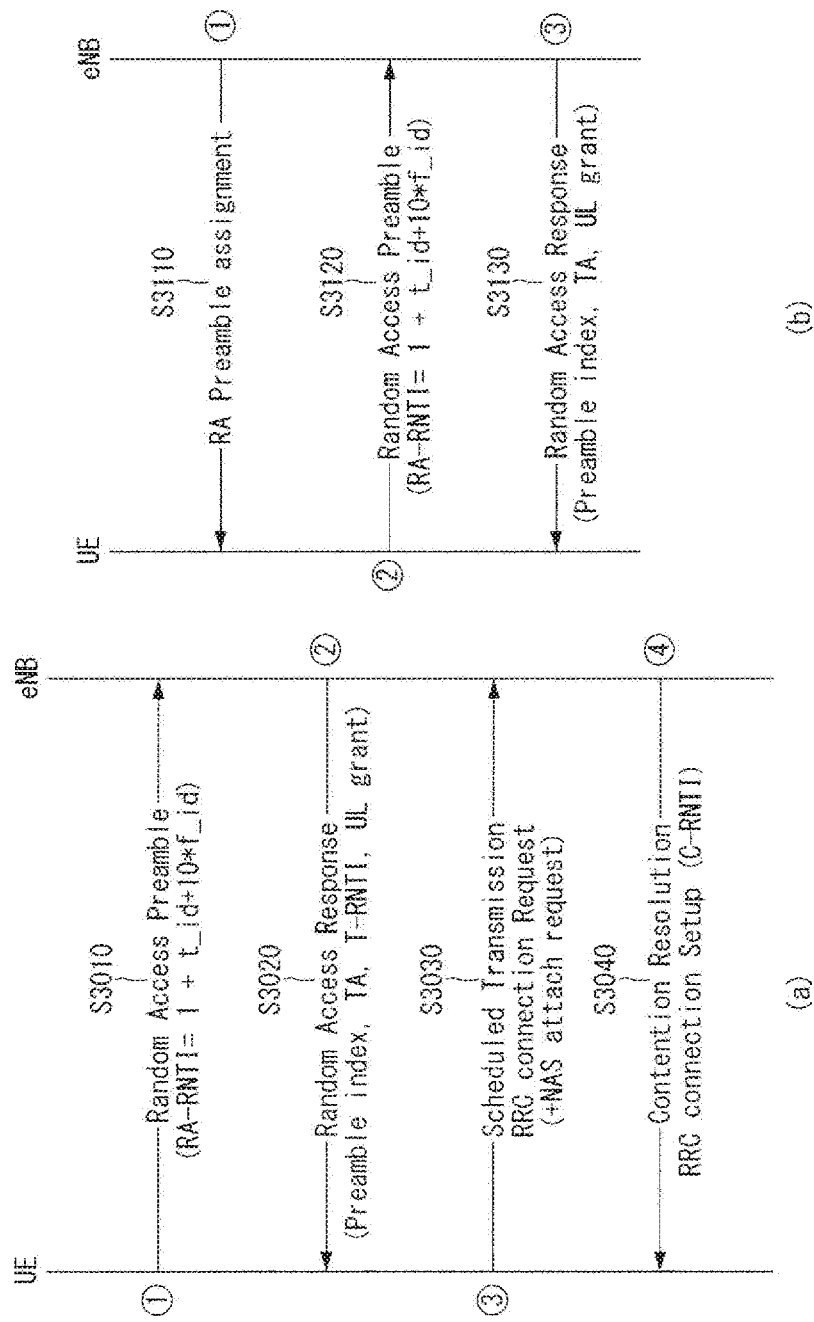
[Figure 3]

【Figure 4】
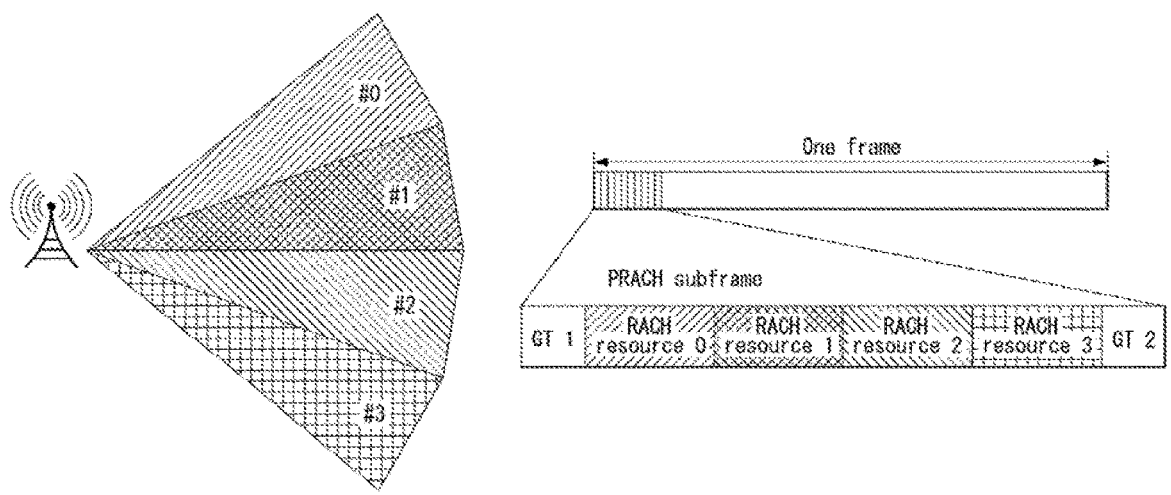

【Figure 5】
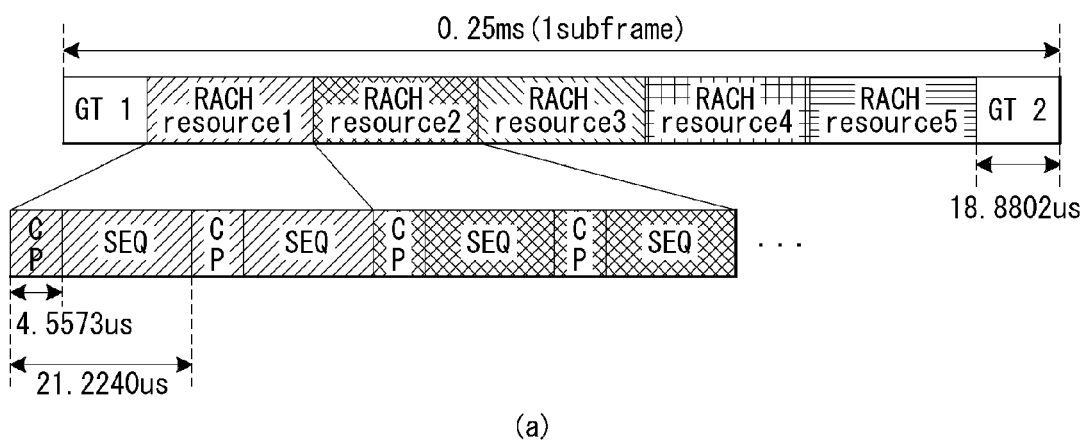
(a)
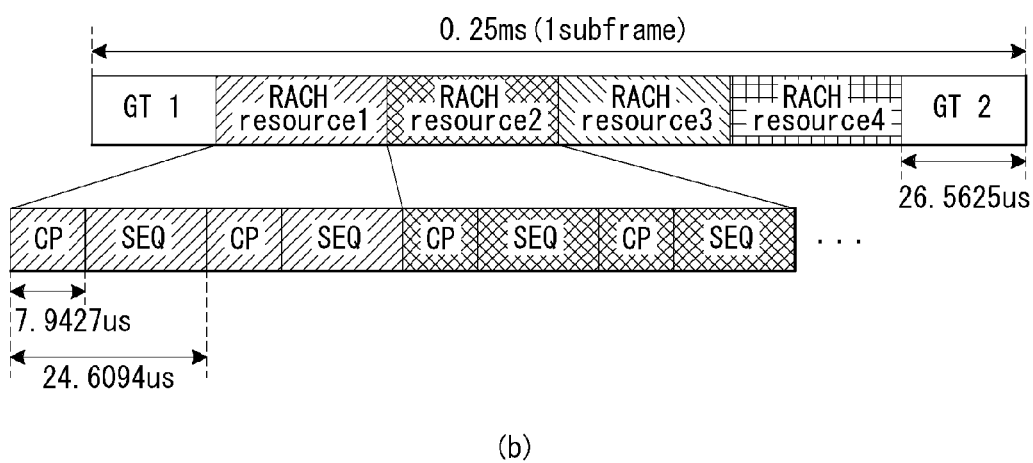
(b)

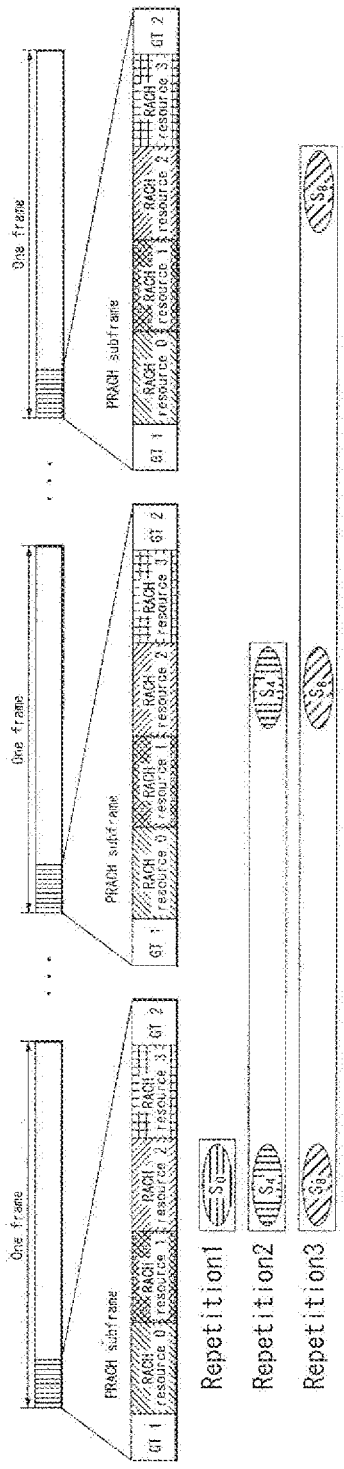
[Figure 6]

【Figure 7】
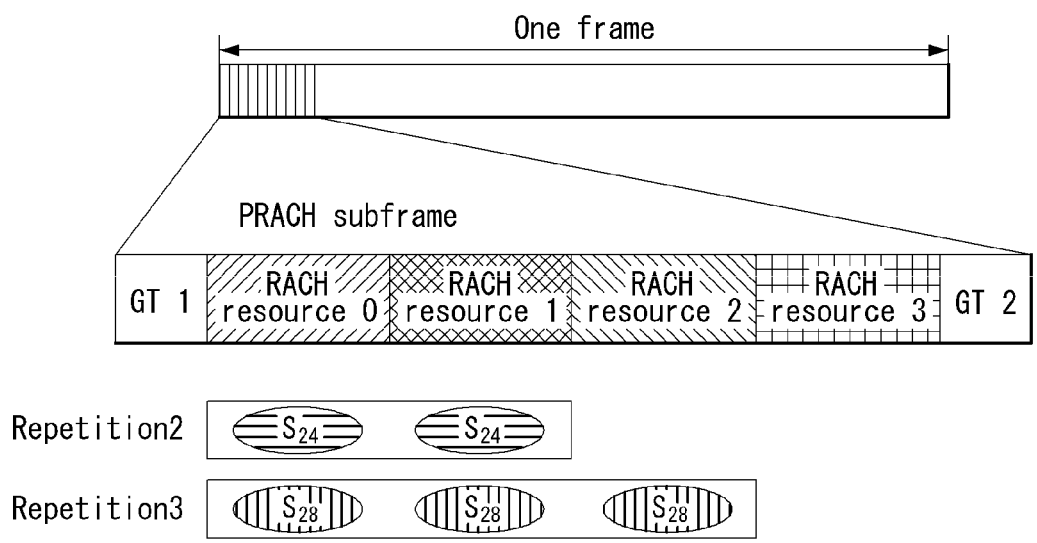

[Figure 8]
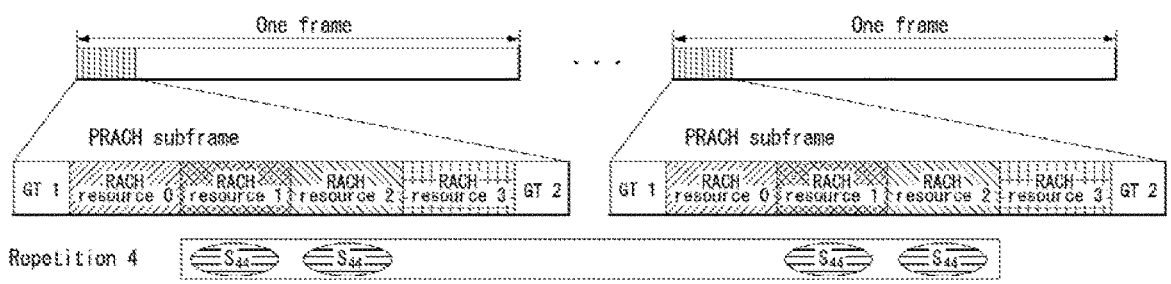

【Figure 9】
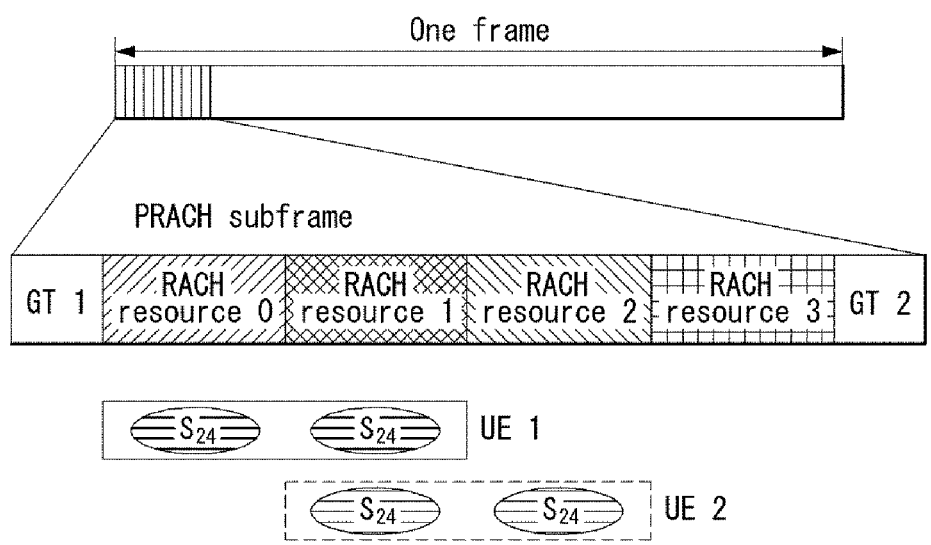

【Figure 10】
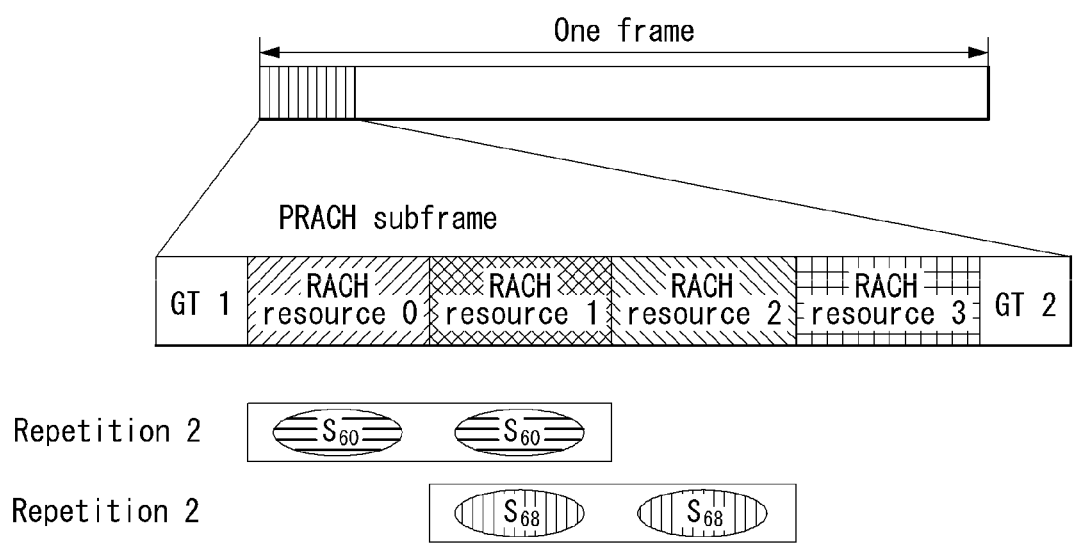

【Figure 11】
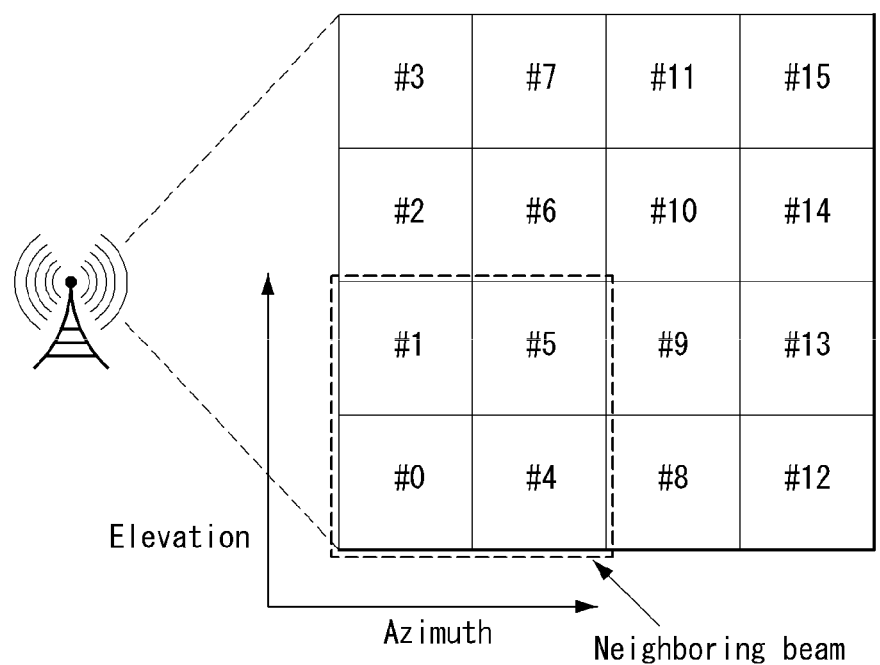

[Figure 12]
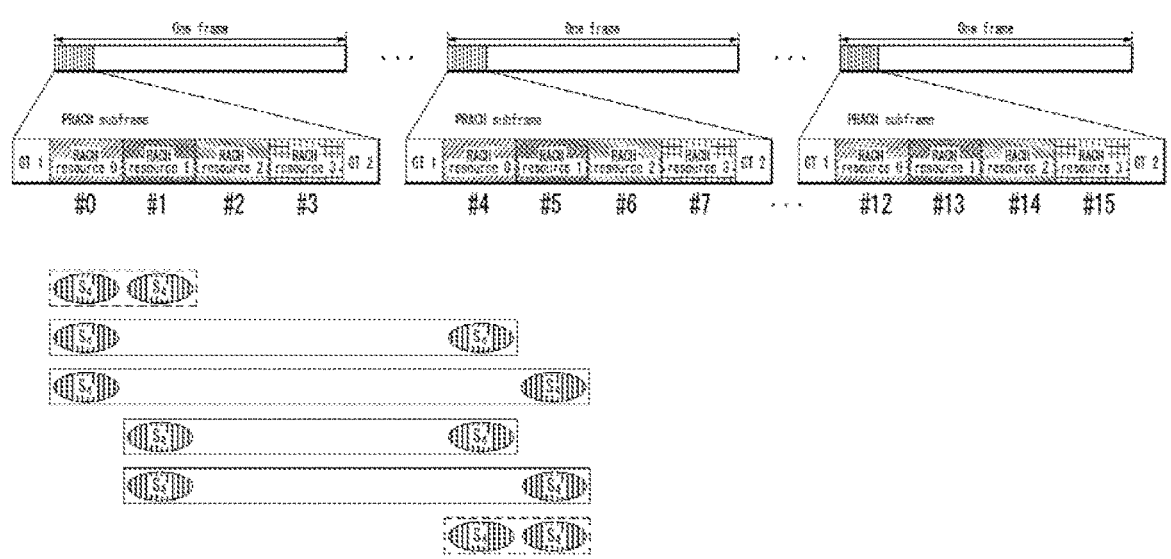

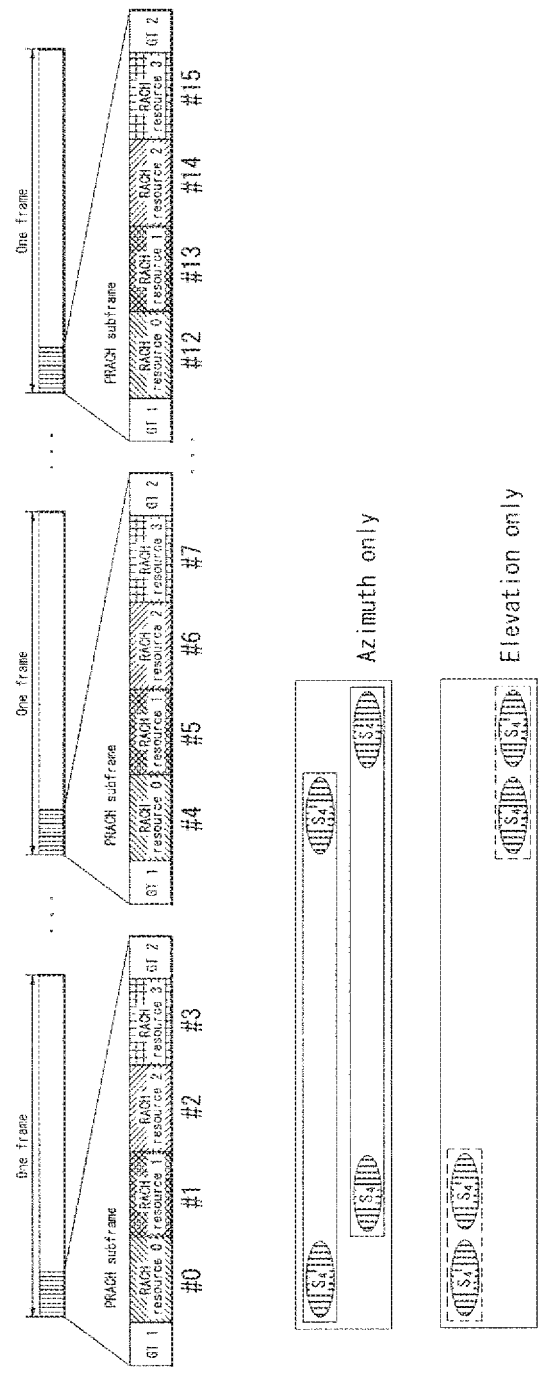

[Figure 14]
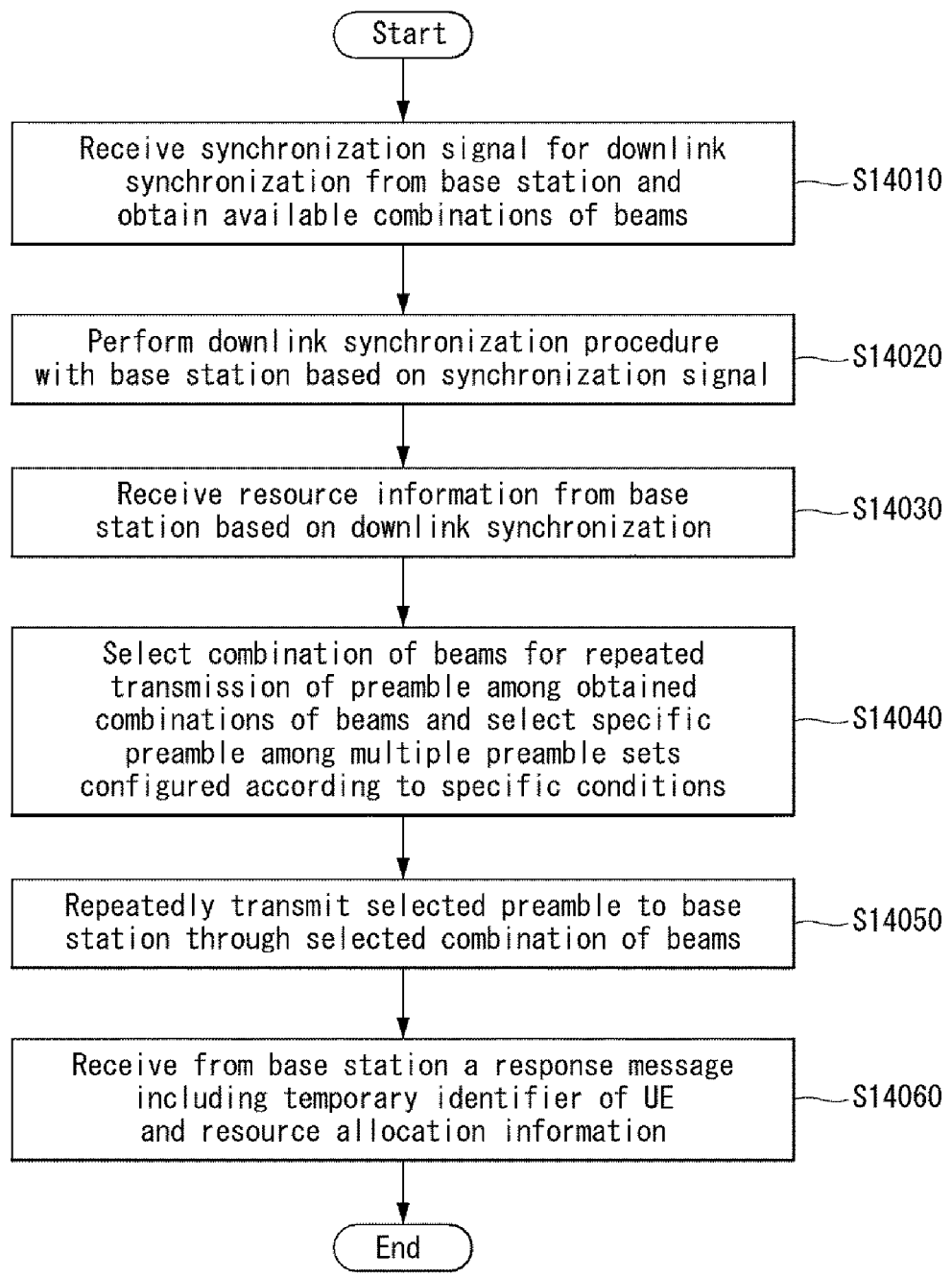

[Figure 15]
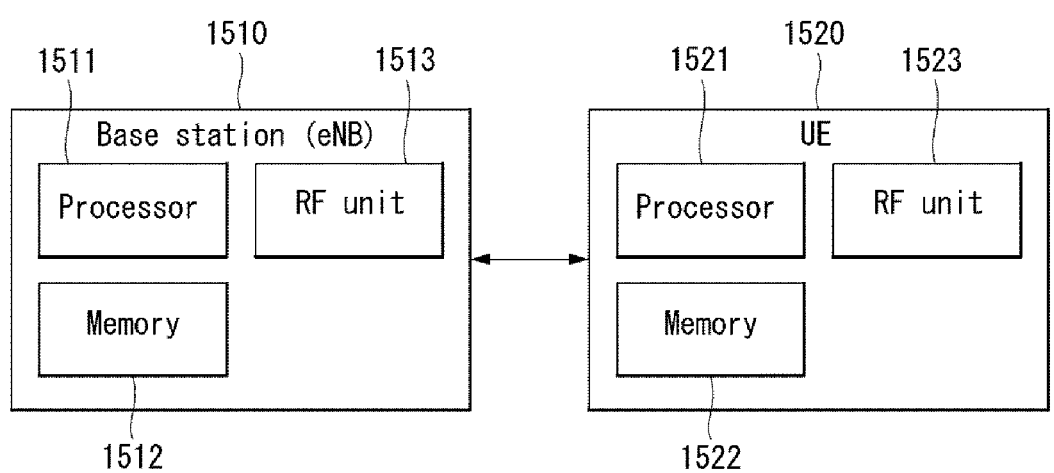

METHOD FOR PERFORMING RANDOM ACCESS IN WIRELESS COMMUNICATION SYSTEM AND DEVICE FOR SUPPORTING SAME

CROSS-REFERENCE TO RELATED APPLICATIONS

This application is the National Stage filing under 35 U.S.C. 371 of International Application No. PCT/KR2017/004518, filed on Apr. 27, 2017, which claims the benefit of U.S. Provisional Application No. 62/328,593, filed on Apr. 27, 2016, the contents of which are all hereby incorporated by reference herein in their entirety.

TECHNICAL FIELD

The present invention relates to a method for performing, by a user equipment (UE), a random access in a wireless communication system, and more particularly to a method for selecting, by a UE, a preamble from a preamble set configured for a random access and repeatedly transmitting the selected preamble and a device supporting the same.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

DISCLOSURE

Technical Problem

An object of the present invention is to provide a method and a device for performing a random access.

Another object of the present invention is to provide a method and a device for transmitting a preamble for a random access of a user equipment (UE) through a beam-forming scheme.

Another object of the present invention is to provide a method and a device for configuring a preamble set according to the number of repeated transmissions of preamble of a UE, the number of beams and subframes to which the preamble is transmitted, and an index of a beam that starts the repeated transmission of the preamble.

Another object of the present invention is to provide a method and a device for selecting a combination of beams transmitting a preamble based on an azimuth angle or an elevation angle.

Technical problems to be solved by the present invention are not limited by the above-mentioned technical problems, and other technical problems which are not mentioned above can be clearly understood from the following description by those skilled in the art to which the present invention pertains.

Technical Solution

In order to solve the above-described and other problems, the present invention provides a method and a device for performing a random access in a wireless communication system.

More specifically, a random access method of a user equipment (UE) according to one embodiment of the present invention comprises selecting a specific preamble from a plurality of preamble sets configured according to a specific condition; repeatedly transmitting the selected specific preamble to a base station through one or a plurality of different neighboring beams; and receiving from the base station a response message including a temporary identifier of the UE as a response to the preamble, wherein the selected specific preamble is repeatedly transmitted on resources distinguished according to the one or plurality of different beams constituting a subframe.

In the present invention, the resources include two same preambles and two cyclic prefixes (CPs), and one of the two CPs is located between the two same preambles.

In the present invention, the specific condition is determined depending on the number of subframes, the number of beams, or the number of repeated transmissions of the preamble used for repeated transmission of the preamble.

In the present invention, the selected preamble is repeatedly transmitted through different resources distinguished by different neighboring beams in the same subframe.

In the present invention, the selected preamble is repeatedly transmitted through a resource distinguished by the same beam in different subframes.

The method according to the present invention further comprises receiving from the base station a synchronization signal for downlink synchronization; obtaining combinations of beams available by the UE based on the synchronization signal; selecting a specific combination of beams among the available combinations of beams; and acquiring the downlink synchronization of the base station using the selected combination of beams.

The method according to the present invention further comprises receiving from the base station resource information for the random access, wherein the resource information includes at least one of OFDM symbol information and subframe information that are mapped to a beam for the base station to receive a signal, frequency resource information, preamble information indicating the plurality of preamble sets, and scheme information indicating a combination scheme of beams for the preamble transmission.

The method according to the present invention further comprises selecting the one or plurality of different beams for transmitting the selected preamble among the available combinations of beams.

In the present invention, when the base station uses a two-dimensional (2D) beam, the one or plurality of different beams are selected in an azimuth angle direction or an elevation angle direction based on the scheme information.

In the present invention, the specific condition is determined by an index of a beam that starts the repeated transmission of the preamble, and the number of repeated transmissions of the preamble in the same subframe.

The present invention provides a user equipment (UE) comprising a communication unit configured to transmit and receive a radio signal with an outside; and a processor functionally coupled to the communication unit, wherein the processor is configured to select a specific preamble from a plurality of preamble sets configured according to a specific condition, repeatedly transmit the selected specific preamble to a base station through one or a plurality of different beams, and receive from the base station a response message including a temporary identifier of the UE as a response to the preamble, wherein the selected specific preamble is repeatedly transmitted on resources distinguished according to the one or plurality of different beams constituting a subframe.

Advantageous Effects

The present invention has an effect capable of compensating for a path attenuation that may occur in a high frequency band by transmitting a preamble through a beamforming scheme in the high frequency band.

The present invention can also prevent a case where a UE cannot transmit a preamble through a beamforming scheme according to a location by repeatedly transmitting a preamble for random access in one or a plurality of subframes.

The present invention also has an effect that a base station can accurately detect a transmitted preamble even if multiple UEs transmit the preamble using neighboring beams, by configuring a preamble set according to an index of a beam for transmitting the preamble.

The present invention also has an effect capable of reducing reception complexity and the number of preambles by selecting a beam for transmitting the preamble based on an azimuth angle or an elevation angle.

Effects obtainable from the present invention are not limited by the above-mentioned effect, and other effects which are not mentioned above can be clearly understood from the following description by those skilled in the art to which the present invention pertains.

DESCRIPTION OF DRAWINGS

The accompanying drawings, that are included to provide a further understanding of the present invention and are incorporated in and constitute a part of the present invention, illustrate embodiments of the present invention and together with the description serve to explain various principles of the present invention.

FIG. 1 is a view illustrating an Evolved Packet System which is associated with the Long Term Evolution (LTE) system to which the present invention can be applied.

FIG. 2 illustrates an example of an uplink resource allocation procedure of a user equipment (UE) in a wireless communication system to which the present invention is applicable.

FIG. 3 illustrates an example of a random access procedure in the LTE system.

FIG. 4 illustrates an example of an analog beamforming and a subframe structure to which the present invention is applicable.

FIG. 5 illustrates an example of a resource structure to which the present invention is applied.

FIG. 6 illustrates an example of a method for repeatedly transmitting a preamble for random access using the same beam to which the present invention is applied.

FIG. 7 illustrates an example of a method for repeatedly transmitting a preamble for random access using neighboring beams to which the present invention is applied.

FIG. 8 illustrates an example of a method for repeatedly transmitting a preamble for random access using neighboring beams and a plurality of subframes to which the present invention is applied.

FIGS. 9 and 10 illustrate another example of a method for repeatedly transmitting a preamble for random access using neighboring beams to which the present invention is applied.

FIGS. 11 to 13 illustrate an example of a method for selecting a combination of beams for repeatedly transmitting a preamble to which the present invention is applied.

FIG. 14 is a flow chart illustrating an example of a method for repeatedly transmitting, by a UE, a preamble for random access to which the present invention is applied.

FIG. 15 illustrates an example of an internal block diagram of a wireless device to which the present invention is applicable.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the present disclosure, a base station has the meaning of a terminal node of a network over which the base station directly communicates with a terminal. In the present disclosure, a specific operation that is described to be performed by the base station may be performed by an upper node of the base station according to circumstances. That is, it is evident that in a network consisting of multiple network nodes including the base station, various operations performed for communication with a terminal may be performed by the base station or other network nodes other than the base station. The base station (BS) may be replaced by the term, such as a fixed station, a Node B, an eNB (evolved-NodeB), a base transceiver system (BTS), an access point (AP), and a network node. Furthermore, the terminal may be fixed or may have mobility and may be replaced by the term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, and a device-to-device (D2D) device.

Hereinafter, the downlink (DL) means communication from a base station to a terminal, and the uplink (UL) means communication from a terminal to a base station. In the downlink, a transmitter may be part of a base station, and a receiver may be part of a terminal.

In the uplink, a transmitter may be part of a terminal, and the receiver may be part of a base station.

Specific terms described in the following description are provided to help understanding of the present invention, and the use of such specific terms may be changed in other forms without departing the technical spirit of the present invention.

The following technology may be used for various radio access systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented as a radio technology, such as universal terrestrial radio access (UTRA) or CDMA2000. TDMA may be implemented as a radio technology, such as global system for mobile communications (GSM)/general packet radio service (GPRS)/enhanced data rates for GSM evolution (EDGE). OFDMA may be implemented as a radio technology, such as IEEE 802.11 (Wi-Fi), IEEE 802.16 (WiMAX), IEEE 802-20, or evolved UTRA (E-UTRA). UTRA is part of a universal mobile telecommunications system (UMTS). 3rd generation partnership project (3GPP) long term evolution (LTE) is part of an evolved UMTS (E-UMTS) using E-UTRA, and adopts OFDMA in the downlink and adopts SC-FDMA in the uplink. LTE-advanced (A) is the evolution of 3GPP LTE.

Embodiments of the present invention may be supported by at least one standard document which is described in IEEE 802, 3GPP and 3GPP2, which are wireless access systems. That is, among the embodiments of the present invention, steps or parts that are not described for disclosing the technical concept of the present invention apparently may be supported by the documents. In addition, all terms disclosed in this document may be described by the standard document.

For clear description, the present invention is described mainly for 3GPP LTE/LTE-A, but the technical features of the present invention are not limited thereto, but may also be applied to 5G system.

Before describing with reference to drawings, for understanding the present invention, the terms used in the present disclosure are briefly defined.

EPS: This is an abbreviation of Evolved Packet System, and means a core network that supports Long Term Evolution (LTE) network. This is a network in the form evolved from UMTS.

PDN (Public Data Network): An independent network at which a server that provides a service is located APN (Access Point Name): This is a name of an access point managed in a network, and provided to a UE. That is, this indicates a name (a character string) of the PDN. Based on the name of an access point, the corresponding PDN for transmitting and receiving data is determined.

TEID (Tunnel Endpoint Identifier): This is an End point ID of a tunnel configured between nodes in a network, and configured in each section as a unit of bearer of each UE.

MME: This is an abbreviation of Mobility Management Entity, and plays the role of controlling each entity in the EPS in order to provide a session and mobility for a UE.

Session: A session is a passage for transmitting data, and the unit may be a unit of PDN, Bearer, IP flow, and so on.

A difference of each unit may be distinguished by a target network entire unit (a unit of APN or PDN), a unit distinguished by QoS therein (a unit of Bearer) and a unit of destination IP address as defined in 3GPP.

EPS Bearer: A logical path generated between a UE and a gateway through which various types of traffics are transmitted and received.

Default EPS Bear: This is a logical path for transmitting and receiving data which is generated basically when a UE accesses to a network, and may be maintained until the UE is detached from the network.

Dedicated EPS Bearer: A logical path generated for being provided with a service additionally after the Default EPS Bear is generated, if it is required.

IP flow: Various types of traffics transmitted and received through a logical path between a UE and a gateway Service Data Flow (SDF): IP flow of a user traffic or combination of a plurality of IP flows which is classified according to a service type.

PDN connection: This represents an association (connection) between a UE represented by an IP address and the PDN represented by the APN. This means a connection (UE-PDN GW) between entities in a core network so as to form a session.

UE Context: State information of a UE used for managing the UE in a network, that is, state information including UE ID, mobility (current location, etc.), an attribute of a session (QoS, priority, etc.)

TIN: Temporary Identity used in Next update
P-TMSI: Packet Temporary Mobile Subscriber
TAU: Tracking Area Update
GBR: Guaranteed Bit Rate
GTP: GPRS Tunneling Protocol
TEID: Tunnel Endpoint ID
GUTI: Globally Unique Temporary Identity, UE identity known to an MME FIG. 1 is a view illustrating an Evolved Packet System which is associated with the Long Term Evolution (LTE) system to which the present invention can be applied.

The LTE system aims to provide seamless Internet Protocol (IP) connectivity between a user equipment (UE, 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station (20), it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present invention, the MME 30 corresponds to an entity in which a function necessary to process authentication of the UE and context information is implemented, where the MME 30 is described as one embodiment of the entity. Therefore, other devices in addition to the MME 30 can also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

In the present invention, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

The PCRF 60 performs policy control decision-making and performs flow-based charging.

The HSS 70 is also called a home location register (HLR), and includes an EPS-subscribed QoS profile and SAE subscription data including access control information for roaming. Furthermore, the HSS also includes information about a PDN accessed by a user. Such information may be maintained in an access point name (APN) form. The APN is a domain name system (DNS)-based label, and is an identity scheme that describes an access point for a PDN or a PDN address indicative of a subscribed IP address.

As shown in FIG. 1, various interfaces, such as S1-U, S1-MME, S5/S8, S11, S6a, Gx, Rx and SG, may be defined between EPS network elements.

Hereinafter, the concept of mobility management (MM) and an MM back-off timer are described in detail. The mobility management (MM) is a procedure for reducing overhead on the E-UTRAN and processing in a UE.

If the mobility management (MM) is applied, all of pieces of information related to a UE in an access network may be released during the cycle in which data is deactivated. The MME may maintain UE context and information related to a configured bearer during an Idle interval.

A UE may notify a network of a new location whenever it deviates from a current tracking area (TA) so that the network may contact the UE in the ECM-IDLE state. Such a procedure may be called "Tracking Area Update." This procedure may be called "Routing Area Update" in a universal terrestrial radio access network (UTRAN) or GSM EDGE radio access network (GERAN) system. The MME performs a function for tracking a user location while a UE is in the ECM-IDLE state.

If downlink data to be delivered to a UE in the ECM-IDLE state is present, the MME transmits a paging message to all of eNodeB on a tracking area (TA) with which the UE has been registered.

Next, the base station starts paging for the UE on a radio interface. When the paging message is received, the base station performs a procedure that enables the state of the UE to switch to the ECM-CONNECTED state. Such a procedure may be called a "Service Request Procedure." Accordingly, information related to the UE is generated in the E-UTRAN, and all of bearers are re-established. The MME performs the re-establishment of the radio bearers and a function of updating UE context on the base station.

If the mobility management (MM) procedure is performed, a mobility management (MM) backoff timer may be additionally used. Specifically, the UE may transmit tracking area update (TAU) in order to update the TA. The MME may reject a TAU request due to core network congestion. In this case, the MME may provide a time value related to the MM backoff timer. When the corresponding time value is received, the UE may activate the MM backoff timer.

Uplink Resource Allocation Procedure

In the case of the 3GPP LTE/LTE-A system, a method for data transmission and reception based on scheduling of an eNB is used to maximize utilization of radio resources. This again implies that in case a UE has data to transmit, the UE requests the eNB to allocate uplink resources in the first place and is capable of transmitting data by using only the uplink resources allocated by the eNB.

FIG. 2 illustrates an uplink resource allocation procedure of a UE in a wireless communication system to which the present invention is applicable.

For efficient use of radio resources in uplink transmission, an eNB needs to know which data and how much of the data to transmit to each UE. Therefore, the UE transmits to the eNB the information about uplink data that the UE attempts to transmit directly, and the eNB allocates uplink resources to the corresponding UE in accordance to the UE's transmission. In this case, the information about uplink data that the UE transmits to the eNB is the amount of uplink data stored in the UE's buffer, which is called buffer status report (BSR). When radio resources on the PUSCH are allocated during a current TTI and a reporting event is triggered, the UE transmits the BSR by using the MAC control element.

FIG. 2(*a*) illustrates an uplink resource allocation process for actual data in case the uplink radio resources for buffer status reporting are not allocated to the UE. In other words, in the case of a UE making a transition from the DRX mode to an active mode, since no data resources are allocated beforehand, the UE has to request resources for uplink data, starting with SR transmission through the PUCCH, and in this case, an uplink resource allocation procedure of five steps is employed.

FIG. 2(*a*) illustrates the case where the PUSCH resources for transmitting BSR are not allocated to the UE, and the UE first of all transmits a scheduling request (SR) to the eNB to receive PUSCH resources S2010.

The scheduling request is used for the UE to request the eNB to allocate the PUSCH resources for uplink transmission in case radio resources are not scheduled on the PUSCH during a current TTI although a reporting event has occurred.

In other words, when a regular BSR has been triggered but uplink radio resources for transmitting the BSR to the eNB are not allocated to the UE, the UE transmits the SR through the PUCCH. Depending on whether the PUCCH resources for SR have been configured, the UE may transmit the SR through the PUCCH or starts a random access procedure. More specifically, the PUCCH resources through the SR can be transmitted are set up by an upper layer (for example, the RRC layer) in a UE-specific manner, and the SR configuration include SR periodicity and SR sub-frame offset information.

If the UE receives from the eNB an UL grant with respect to the PUSCH resources for BSR transmission S2020, the UE transmits the BSR to the eNB, which has been triggered through the PUSCH resources allocated by the UL grant S2030.

By using the BSR, the eNB checks the amount of data for the UE to actually transmit through uplink transmission and transmits to the UE an UL grant with respect to the PUSCH resources for transmission of actual data S2040. The UE, which has received the UL grant meant for transmission of actual data, transmits to the eNB actual uplink data through the allocated PUSCH resources S2050.

FIG. 2(b) illustrates an uplink resource allocation process for actual data in case the uplink radio resources for buffer status reporting are allocated to the UE.

FIG. 2(b) illustrates the case where the PUSCH resources for BSR transmission have already been allocated to the UE; the UE transmits the BSR through the allocated PUSCH resources and transmits a scheduling request to the eNB along with the BSR transmission S2110. Next, by using the BSR, the eNB check the amount of data that the UE actually transmits through uplink transmission and transmits to the UE an UL grant with respect to the PUSCH resources for transmission of actual data S12120. The UE, which has received an UL grant for transmission of actual data, transmits actual uplink data to the eNB through the allocated PUSCH resources S2130.

Random Access Procedure (RACH)

FIG. 3 illustrates an example of a random access procedure in the LTE system.

The UE carries out the random access procedure (RACH) at the time of the initial connection in the RRC_IDLE state, initial connection after radio link failure, handover requiring the RACH, and generation of uplink or downlink data requiring the RACH while in the RRC_CONNECTED state. Part of RRC messages such as the RRC connection request message, cell update message, and UTRAN Registration Area (URA) update message are also transmitted through the random access procedure. Logical channels such as Common Control Channel (CCCH), Dedicated Control Channel (DCCH), and Dedicated Traffic Channel (DTCH) can be mapped to a transmission channel RACH. A transmission channel RACH is mapped to a physical channel such as the Physical Random Access Channel (PRACH).

If the UE's MAC layer commands the UE's physical layer to start PRACH transmission, the UE's physical layer first selects one access slot and one signature to transmit the PRACH preamble to the uplink. Two types of random access procedure are defined: contention based and non-contention based random access procedure.

FIG. 3(a) illustrates one example of a contention based random access procedure, while FIG. 3(b) illustrates one example of a non-contention based random access procedure.

First, contention based random access procedure will be described with reference to FIG. 3(a).

The UE receives information about random access from the eNB through system information and stores the received information. Afterwards, in case random access is required, the UE transmits a random access preamble (which is also called a message 1) to the base station S3010.

If the eNB receives a random access preamble from the UE, the eNB transmits a random access response (which is also called a message 2) to the UE S3020. To be specific, downlink scheduling information with respect to the random access response message is CRC masked with a Random Access-Radio Network Temporary Identifier (RA-RNTI) and transmitted on the L1 or L2 control channel (PDCCH). The UE, having receiving a downlink scheduling signal masked with the RA-RNTI, receives a random access response message from a Physical Downlink Shared Channel (PDSCH) and decodes the received random access response message. Afterwards, the UE checks the random access response message whether it contains random access response information directed to the UE.

Existence of random access response information directed to the UE can be determined by checking a Random Access Preamble ID (RAID) with respect to a preamble that the UE has transmitted.

The random access response information includes Timing Alignment (TA) representing timing offset information for synchronization, allocation information of radio resources used for uplink, and a temporary C-RNTI for UE identification.

In case random access response information is received, the UE carries out uplink transmission (which is also called a message 3) to a uplink Shared Channel (SCH) according to the radio resource allocation information included in the response information. At this time, uplink transmission may be expressed as scheduled transmission.

After receiving the uplink transmission from the UE, the eNB transmits a message for contention resolution (which is also called a message 4) to the UE through a Downlink Shared Channel (DL-SCH) in S3040.

Next, non-contention based random access procedure will be described with reference to FIG. 3(b).

Before the UE transmits a random access preamble, the eNB allocates a non-contention based random access preamble to the UE in S3110.

The non-contention based random access preamble can be allocated through a handover command or dedicated signaling such as a PDCCH. In case a non-contention based random access preamble is allocated to the UE, the UE transmits the allocated non-contention based random access preamble to the eNB in S3120.

Afterwards, the eNB is able to transmit a random access response (which is also called a message 2) to the UE similarly to the S3020 step of the contention based random access procedure in S3130.

Although HARQ has not been applied to the random access response during the random access procedure above, the HARQ can be applied to uplink transmission with respect to the random access response or a message for contention resolution. Therefore, the UE doesn't necessarily have to transmit ACK or NACK with respect to the random access response.

In the random access procedure, the step of transmitting the preamble uses a separate physical layer processing designed for random access, and the remaining steps use the same physical layer processing as that used for normal downlink and uplink data transmission.

FIG. 4 illustrates an example of an analog beamforming and a subframe structure to which the present invention is applicable.

Referring to FIG. 4, a subframe for random access can be separated in a time domain by an analog beam.

More specifically, since a high frequency band above 6 GHz has very high path attenuation when compared with a band below 6 GHz that is a band of a cellular communication system, a beamforming technology is necessary to compensate for the very high path attenuation.

The high frequency band can include a large number of antennas in a small area by decreasing an antenna spacing. However, hardware complexity of a digital beamforming scheme that processes all of antenna signals using a baseband process is very high.

Accordingly, in order to obtain advantages of the digital beamforming scheme while reducing the hardware complexity, a hybrid beamforming scheme combinedly using an analog beamforming scheme and the digital beamforming scheme is considered.

Because the hybrid beamforming scheme uses the analog beamforming scheme, it has a problem that resources available at the same time may be limited.

Furthermore, because a width of a beam is narrow when the beamforming scheme is used as shown in FIG. 4, there is a problem that a preamble cannot be transmitted when a UE moves or goes out of a region of the beam.

Namely, when the UE that is present in a region of beam #0 moves to a region of beam #1, the UE cannot transmit and receive a preamble via the beam #0.

Accordingly, the present invention proposes a method for repeatedly transmitting a preamble for random access several times in order to solve the problems.

FIG. 5 illustrates an example of a resource structure to which the present invention is applied.

Referring to FIG. 5, a subframe may be composed of a plurality of RACH resources in order to transmit a physical random access channel (PRACH) preamble for a random access procedure using the beamforming scheme illustrated in FIG. 4.

More specifically, as shown in FIG. 5, in a cellular communication system of a high frequency band using an analog beamforming technology, a subframe may have a plurality of RACH resource structures, in order to use a suitable PRACH preamble for each cell having a different coverage.

In FIG. 5, (a) illustrates an example of a subframe composed of five RACH resources in order to transmit a PRACH preamble. As shown in (a) of FIG. 5, when five beams are formed by the beamforming technology illustrated in FIG. 4, one subframe may include five RACH resources and guard times (GTs) for transmitting and receiving a PRACH preamble.

In each RACH resource, a cyclic prefix (CP) and a PRACH preamble sequence make a pair and are repeatedly transmitted and received.

Namely, each RACH resource includes two CPs and the same two preamble sequences.

In FIG. 5, (b) illustrates an example of a subframe composed of four RACH resources in order to transmit a PRACH preamble. As shown in (b) of FIG. 5, when four beams are formed by the beamforming technology illustrated in FIG. 4, one subframe may include four RACH resources and guard times for transmitting and receiving a PRACH preamble.

The subframes illustrated in (a) and (b) of FIG. 5 are different in a length of one RACH resource. This is because the CP constituting each RACH resource has a different length. Supportable sizes of cells in (a) and (b) of FIG. 5 may be different due to different lengths of the CPs. Namely, the subframe shown in (b) of FIG. 5 with a longer CP may support a larger-sized cell.

As described above, a RACH preamble can be repeatedly transmitted through a RACH resource structure of the subframe that is differently configured depending on the number of beams for transmitting the PRACH preamble.

FIG. 6 illustrates an example of a method for repeatedly transmitting a preamble for random access using the same beam to which the present invention is applied.

Referring to FIG. 6, when a UE repeatedly transmits a PRACH preamble using the same PRACH reception beam, the UE can configure a preamble set depending on the number of subframes used in the repeated transmission.

More specifically, when the UE repeatedly transmits a PRACH preamble for random access using the same beam, the UE can configure a RACH preamble set depending on the number of repeated transmissions.

The following Table 1 indicates an example of a RACH preamble set configured depending on the number of repeated transmissions when repeatedly transmitting a PRACH preamble using the same beam.

TABLE 1

|  | Number of repeated transmissions | PRACH Preamble |
| --- | --- | --- |
| PRACH Preamble Sets | 1 | $\{S_0, S_1, S_2, S_3\}$ |
|  | 2 | $\{S_4, S_5, S_6, S_7\}$ |
|  | 3 | $\{S_8, S_9, S_{10}, S_{11}\}$ |
|  | 4 | $\{S_{12}, S_{13}, S_{14}, S_{15}\}$ |
|  | 5 | $\{S_{16}, S_{17}, S_{18}, S_{19}\}$ |
|  | 6 | $\{S_{20}, S_{21}, S_{22}, S_{23}\}$ |

FIG. 6 illustrates an example where the UE repeatedly transmits a PRACH preamble using a beam #2 of the base station. As shown in FIG. 6, when the UE repeatedly transmits a PRACH preamble using the same beam, the UE can repeatedly transmit the PRACH preamble using the same beam in different subframes.

In this instance, the UE can select a specific preamble in the preamble set of Table 1 configured depending on the number of repeated transmissions and can transmit the specific preamble to the base station.

For example, when the UE repeatedly transmits a PRACH preamble three times, the UE selects one PRACH preamble in $\{S_8, S_9, S_{10}, S_{11}\}$ and transmits to the base station a PRACH preamble selected on RACH resource 2 of each subframe.

FIG. 7 illustrates an example of a method for repeatedly transmitting a preamble for random access using neighboring beams to which the present invention is applied.

Referring to FIG. 7, when the UE repeatedly transmits a PRACH preamble using neighboring PRACH reception beams, the UE can configure a preamble set depending on the number of neighboring beams used in the repeated transmission.

More specifically, when the UE repeatedly transmits a PRACH preamble for random access using neighboring beams on one subframe, the UE can configure a RACH preamble set depending on the number of neighboring beams used in the repeated transmission.

The following Table 2 indicates an example of a RACH preamble set configured depending on the number of repeated transmissions when repeatedly transmitting a PRACH preamble using neighboring beams.

TABLE 2

| | Number of repeated transmissions | PRACH Preamble |
|---|---|---|
| PRACH Preamble Sets | 2 | {$S_{24}, S_{25}, S_{26}, S_{27}$} |
| | 3 | {$S_{28}, S_{29}, S_{30}, S_{31}$} |
| | 4 | {$S_{32}, S_{33}, S_{34}, S_{35}$} |
| | 6 | {$S_{36}, S_{37}, S_{38}, S_{39}$} |
| | 7 | {$S_{40}, S_{41}, S_{42}, S_{43}$} |

FIG. 7 illustrates an example where the UE repeatedly transmits a PRACH preamble using beams #0 and #1 or beams #0, #1 and #2 of the base station. As shown in FIG. 7, when the UE repeatedly transmits a PRACH preamble using neighboring beams on one subframe, the UE can repeatedly transmit the PRACH preamble using neighboring different beams on one subframe.

In this instance, the UE can select a specific preamble in the preamble set of Table 2 configured depending on the number of repeated transmissions and can transmit the specific preamble to the base station.

For example, when the UE repeatedly transmits a PRACH preamble using the beams #0 and #1, the UE selects one PRACH preamble in {$S_{24}, S_{25}, S_{26}, S_{27}$} and transmits to the base station a PRACH preamble selected on RACH resources 0 and 1 of one subframe.

FIG. 8 illustrates an example of a method for repeatedly transmitting a preamble for random access using neighboring beams and a plurality of subframes to which the present invention is applied.

Referring to FIG. 8, when the UE repeatedly transmits a PRACH preamble using neighboring PRACH reception beams and a plurality of subframes, the UE can configure a preamble set depending on the total number of repeated transmissions of PRACH preamble.

More specifically, when the UE repeatedly transmits a PRACH preamble for random access using neighboring beams on a plurality of subframes, the UE can configure a RACH preamble set depending on the total number of repeated transmissions of PRACH preamble.

The following Table 3 indicates an example of a RACH preamble set configured depending on the total number of repeated transmissions of PRACH preamble when repeatedly transmitting a PRACH preamble using a plurality of subframes and neighboring beams.

TABLE 3

| | Number of repeated transmissions | PRACH Preamble |
|---|---|---|
| PRACH Preamble Sets | 4 | {$S_{44}, S_{45}, S_{46}, S_{47}$} |
| | 6 | {$S_{48}, S_{49}, S_{50}, S_{51}$} |

FIG. 8 illustrates an example where the UE repeatedly transmits a PRACH preamble using beams #1 and #2 of the base station on a plurality of subframes. As shown in FIG. 8, when the UE repeatedly transmits a PRACH preamble using neighboring beams on a plurality of subframes, the UE can repeatedly transmit the PRACH preamble using neighboring different beams on the plurality of subframes.

In this instance, the UE can select a specific preamble in the preamble set of Table 3 configured depending on the number of repeated transmissions and can transmit the specific preamble to the base station.

For example, when the UE intends to repeatedly transmit a PRACH preamble using the beams #1 and #2 four times, the UE selects one PRACH preamble in {$S_{44}, S_{45}, S_{46}, S_{47}$} and repeatedly transmits to the base station a PRACH preamble selected on RACH resources 1 and 2 of two subframes.

The UE can repeatedly transmit the same PRACH preamble to the base station using the beamforming scheme through the methods illustrated in FIGS. 6 to 8, and thus has an effect capable of reducing a path attenuation resulting from the beamforming scheme.

In this instance, the UE can obtain combinations of beams (reception and transmission beams) available for transmitting the PRACH preamble illustrated in FIGS. 6 to 8 through a synchronization signal of the base station, and information related to the configured PRACH preamble sets can be transmitted to the UE via the signaling of the base station.

FIGS. 9 and 10 illustrate another example of a method for repeatedly transmitting a preamble for random access using neighboring beams to which the present invention is applied.

Referring to FIGS. 9 and 10, when multiple UEs repeatedly transmit a PRACH preamble using neighboring beams, they can configure a preamble set according to a beam, at which the repeated transmission of the PRACH preamble is started, in order for the base station to prevent an erroneous detection according to a signal strength of a PRACH preamble transmitted by a specific UE.

More specifically, when the multiple UEs repeatedly transmit the PRACH preamble using neighboring beams, the base station may erroneously detect a PRACH preamble if a signal strength of a PRACH preamble transmitted by a specific UE is greater than a signal strength of a PRACH preamble transmitted by other UEs.

For example, referring to FIG. 9, a UE 1 repeatedly transmits a PRACH preamble using beams #0 and #1, and a UE 2 repeatedly transmits a PRACH preamble using beams #1 and #2.

In this instance, when a signal strength of a PRACH preamble the UE 1 transmits on RACH resource 1 is strong, i.e., when the PRACH preamble transmitted on the RACH resource 1 using the beam #1 is strongly received to the base station, the base station can recognize that the UE 2 is present even if the UE 2 does not actually transmit the preamble.

In this case, the UE 2 actually transmitting the PRACH preamble is not present, and a problem such as a PRACH collision may not occur. However, the base station recognizes that the UE 2 has transmitted the PRACH preamble although the UE 2 does not actually transmit the PRACH preamble, and allocates a resource for random access to the UE 2. Hence, a problem that the resource is wasted may occur.

Accordingly, in order to solve the above-described problem, when the PRACH preamble is repeatedly transmitted, a preamble set can be configured according to a beam at which the repeated transmission of the PRACH preamble is started.

The following Table 4 indicates an example of a preamble set configured according to a beam at which repeated transmission of a PRACH preamble is started.

TABLE 4

| | Index of start beam | Number of repeated transmissions | PRACH Preamble |
|---|---|---|---|
| PRACH Preamble Sets | 0 | 2 | {$S_{52}, S_{53}, S_{54}, S_{55}$} |
| | | 3 | {$S_{56}, S_{57}, S_{58}, S_{59}$} |
| | 1 | 2 | {$S_{60}, S_{61}, S_{62}, S_{63}$} |

TABLE 4-continued

| Index of start beam | Number of repeated transmissions | PRACH Preamble |
|---|---|---|
| | 3 | {S$_{64}$, S$_{65}$, S$_{66}$, S$_{67}$} |
| 2 | 2 | {S$_{68}$, S$_{69}$, S$_{70}$, S$_{71}$} |
| | 3 | {S$_{72}$, S$_{73}$, S$_{74}$, S$_{75}$} |
| 3 | 2 | {S$_{76}$, S$_{77}$, S$_{78}$, S$_{79}$} |
| | 3 | {S$_{80}$, S$_{81}$, S$_{82}$, S$_{83}$} |

FIG. 10 illustrates an example where a UE 1 repeatedly transmits a PRACH preamble using beams #1 and #2 of the base station and a UE 2 repeatedly transmits a PRACH preamble using the beams #1 and #2 of the base station when repeatedly transmitting the same PRACH preamble twice.

As shown in FIG. 10, when the multiple UEs repeatedly transmit a PRACH preamble on a plurality of subframes using neighboring beams, the UE can repeatedly transmit the PRACH preamble on the same subframe using neighboring different beams.

In this instance, the UE can select a specific preamble in the preamble set of Table 4 configured according to a beam, at which the repeated transmission of the PRACH preamble is started, and can transmit the specific preamble to the base station.

For example, when the UE 1 intends to repeatedly transmit a PRACH preamble twice using the beams #1 and #2, the UE 1 selects one PRACH preamble in {S$_{60}$, S$_{61}$, S$_{62}$, S$_{63}$} and repeatedly transmits to the base station a PRACH preamble selected on RACH resources 1 and 2 of one subframe.

When the UE 2 intends to repeatedly transmit a PRACH preamble twice using beams #2 and #3, the UE 2 repeatedly transmits the PRACH preamble twice in the same manner as the UE 1. However, because the UE 2 is different from the UE 1 in an index of a beam starting the repeated transmission of the PRACH preamble, the UE 2 selects a PRACH preamble in a preamble set different from the UE 1.

Namely, the UE 2 selects one PRACH preamble in {S$_{68}$, S$_{69}$, S$_{70}$, S$_{71}$} and repeatedly transmits to the base station a PRACH preamble selected on RACH resources 1 and 2 of one subframe.

As described above, when the different UEs repeatedly transmit the PRACH preamble the same number of times, the UEs differently configure a PRACH preamble set according to an index of a beam starting the repeated transmission of the PRACH preamble. Hence, the base station can clearly recognize which the UE has transmitted the PRACH preamble.

FIGS. 11 to 13 illustrate an example of a method for selecting a combination of beams for repeatedly transmitting a preamble to which the present invention is applied.

Referring to FIGS. 11 to 13, when a two-dimensional (2D) beam is used, a PRACH preamble can be repeatedly transmitted in consideration of only a combination of specific beams.

More specifically, as shown in FIG. 11, the base station uses a 2D beam, there may exist various combinations of beams available to the UE by a location and a multi-path of the UE.

For example, in FIG. 11, the UE can transmit the PRACH preamble using beams #0, #1, #4 and #5.

In this instance, as shown in FIG. 12, there may exist a plurality of combinations of beams for the UE to repeatedly transmit the PRACH preamble.

When there are various combinations of beams for the UE to repeatedly transmit the PRACH preamble, reception complexity increases, and the base station may erroneously detect the PRACH preamble due to an increase in the number of PRACH preambles.

Accordingly, in order to solve the problem, when the base station uses 2D or more beam, the combinations of beams can be limited.

For example, when the 2D beam is used as shown in FIG. 11, the UE can select a combination of beams only in a direction of an azimuth angle or an elevation angle and can repeatedly transmit the PRACH preamble.

The following Table 5 indicates an example of the number of possible beam combinations according to a combination scheme of beams when a 2D beam is used.

TABLE 5

| Combination scheme | Number of possible beam combinations |
|---|---|
| 2-Dimension | 6 |
| Azimuth Only | 2 |
| Elevation Only | 2 |

As indicated by Table 5, if the base station uses the 2D beams, and the number of neighboring beams available when the UE repeatedly transmits the PRACH preamble is four, 6 beam combinations are possible when the combinations of beams are not limited. When the combinations of beams are limited in the direction of the azimuth angle or the elevation angle, 2 beam combinations are possible.

In this instance, a PRACH preamble set capable of being transmitted in the combination of beams according to each direction may use the PRACH preamble set illustrated in FIGS. 6 to 10.

FIG. 13 illustrates an example of a case where combinations of beams used for repeated transmission of a PRACH preamble are limited only in a direction of an azimuth angle or an elevation angle when repeatedly transmitting the PRACH preamble.

When a 2D or more beam is used, the base station can inform the UE of a combination scheme of beams available via the signaling, in order to enable the UE to selectively use a combination scheme of beams for repeated transmission of a PRACH preamble according to a situation of the UE.

More specifically, the UE can obtain combinations of beams available to the UE through a synchronization signal transmitted from the base station in a downlink synchronization process. The UE selects an optimum combination of beams among the available combinations of beams and acquires downlink synchronization with the base station.

Here, the combination of beams means a combination of transmission and reception beams between the base station and the UE.

The UE acquiring the downlink synchronization obtains resource information related to a RACH resource via signaling of the base station. In this instance, the signaling of the base station can be performed through a broadcasting channel transmitting system information or/and downlink control information (DCI)/RRC.

The resource information related to the RACH resource may include OFDM symbol and subframe information mapped to a reception beam of the base station, frequency resource information, preamble information, and a combination scheme of beams available for the transmission of the PRACH preamble.

The combination scheme of beams available for the transmission of the PRACH preamble can be transmitted to the UE through configuration information indicated in the following Table 6.

TABLE 6

| Configuration Value | Combination scheme of beams | Possible Case |
|---|---|---|
| 0 | Azimuth Only | a, a + 1 |
| 1 | Elevation Only | a, a + 4 |

Table 6 indicates an example of configuration information when PRACH preamble is repeatedly transmitted twice using neighboring beams of FIG. 11.

In Table 6, when a configuration value is '0', the PRACH preamble can be repeatedly transmitted using only 'a' that is a specific beam and 'a+1' that is different from an index value of 'a' by '1'.

Namely, when the configuration value is '0', combinations of beams for transmitting the PRACH preamble may be selected only in a direction of an azimuth angle.

In Table 6, when the configuration value is '1', the PRACH preamble can be repeatedly transmitted using only 'a' that is a specific beam and 'a+4' that is different from an index value of 'a' by '4'.

Namely, when the configuration value is '1', combinations of beams for transmitting the PRACH preamble may be selected only in a direction of an elevation angle.

Here, when the configuration value is '1', the number of beams may vary depending on the base station. Therefore, information indicating a difference in index between neighboring beams should be additionally transmitted to the UE.

For example, the base station can additionally transmit to the UE the value of '4' indicating a difference in index between neighboring beams in Table 7, and the value can be transmitted with being included in the configuration information.

FIGS. 6 to 13 illustrate the subframe structure illustrated in (a) of FIG. 5 by way of example, but may be applied to various subframe structures as well as the subframe structure illustrated in (b) of FIG. 5.

FIG. 14 is a flow chart illustrating an example of a method for repeatedly transmitting, by a UE, a preamble for random access to which the present invention is applied.

Referring to FIG. 14, the UE receives from the base station a combination of beams for repeatedly transmitting a PRACH preamble and information related to a PRACH preamble set and can repeatedly transmit the PRACH preamble.

More specifically, the UE can obtain a synchronization signal for downlink synchronization from the base station and can obtain combinations of beams available for transmitting and receiving data with the base station based on the synchronization signal in S14010.

The UE selects an optimum combination of beams among the available combinations of beams and performs a downlink synchronization procedure with the base station, thereby acquiring the downlink synchronization in S14020.

The UE acquiring the downlink synchronization obtains resource information related to a RACH resource via signaling of the base station in S14030.

Here, the signaling of the base station can be performed through a broadcasting channel transmitting system information or/and downlink control information (DCI)/RRC.

The resource information related to the RACH resource may include OFDM symbol and subframe information mapped to a reception beam of the base station, frequency resource information, preamble information, and a combination scheme of beams available for the transmission of the PRACH preamble.

The preamble information is information indicating preamble sets configured according to a specific condition so as to repeatedly transmit the PRACH preamble and may include information of the preamble sets illustrated in FIGS. 6 and 13.

The combination scheme of beams available for the transmission of the PRACH preamble may be transmitted to the UE through the configuration information illustrated in FIGS. 11 to 13.

The UE selects a combination of beams for repeatedly transmitting the PRACH preamble among the obtained combinations of beams and selects a specific preamble from a preamble set mapped to the combination of beams selected among preamble sets configured according to a specific condition in S14040.

The UE repeatedly transmits to the base station the specific preamble selected using OFDM symbol and frequency resources mapped to the combination of beams selected based on the RACH resource information in S14050.

The base station can recognize a corresponding UE through the preamble transmitted from the UE.

The UE receives from the base station a response message including a temporary identifier and resource allocation information in S14060.

Afterwards, the UE can perform the steps S3030 and S3040 illustrated in FIG. 3 depending on whether it is a contention based random access procedure or a non-contention based random access procedure.

The present invention has an effect capable of reducing a path attenuation generated in the beam formation by repeatedly transmitting the PRACH preamble for random access to the base station using beams formed by the beamforming scheme through the above-described method.

FIG. 15 illustrates an example of an internal block diagram of a wireless device to which the present invention is applicable.

Here, the wireless device may be a base station and a UE, and the base station includes both a macro base station and a small base station.

As shown in FIG. 15, a base station 1510 and a UE 1520 include communication units (transmission/reception units or RF units) 1513 and 1523, processors 1511 and 1521, and memories 1512 and 1522, respectively.

In addition, the base station and the UE may further include an input unit and an output unit.

The communication units 1513 and 1523, the processors 1511 and 1521, the input units, the output units, and the memories 1512 and 1522 are functionally connected to perform a method proposed by the present disclosure.

If the communication units (transmission/reception units or RF units) 1513 and 1523 receive information made from physical layer protocol, they transfer the received information to a radio frequency (RF) spectrum, perform filtering, amplification, etc. of the information, and transmit the information to an antenna. Further, the communication units transfer a radio frequency (RF) signal received from the antenna to a band that can be processed in the physical layer protocol, and function to perform the filtering.

The communication unit may also include a switch function for switching between the transmission and reception functions.

The processors 1511 and 1521 implement functions, processes and/or methods proposed by the present disclosure. Layers of radio interface protocol may be implemented by the processor.

The processor may be represented by a controller, a control unit, a computer, and the like.

The memories 1512 and 1522 are connected to the processors and store a protocol or a parameter for performing an uplink resource allocation method.

The processors 1511 and 1521 may include an application-specific integrated circuit (ASIC), other chip set, a logic circuit, and/or a data processing device. The memory may include a read-only memory (ROM), a random access memory (RAM), a flash memory, a memory card, a storage medium, and/or other storage devices. The communication unit may include a baseband circuit for processing a radio signal. When embodiments are implemented in software, the above-described method can be implemented by a module (process, function, etc.) performing the above-described functions.

The module is stored in the memory and can be executed by the processor. The memory may be inside or outside the processor and may be connected to the processor by various well known means.

The output unit (display unit or display) is controlled by the processor and outputs information output from the processor together with various information signals from the processor and a key input signal generated in a key input unit.

Furthermore, although the respective figures have been dividedly illustrated for convenience of explanation, it can be designed that embodiments illustrated in each figure are combined to implement a new embodiment. It is also within the scope of the present invention to design a computer readable recording medium in which a program for executing the previously described embodiments is recorded according to the needs of those skilled in the art.

A direction-based device search method according to the present disclosure is not limitedly applied to the configuration and method of the embodiments described above, but may be implemented by selectively combining all or some of the respective embodiments so that various modifications of the embodiments can be made.

The direction-based device search method according to the present disclosure can be implemented as a processor-readable code on a processor-readable recording medium included in a network device. The processor-readable recording medium includes all kinds of recording devices for storing data which can be read by a processor. Examples of the processor-readable recording medium include ROM, RAM, CD-ROM, a magnetic tape, a floppy disk, and an optical data storage device, and the processor-readable recording medium also includes a device implemented in the form of a carrier wave, for example, transmission over Internet. In addition, the processor-readable recording medium may be may be distributed to computer systems connected over a network, and the processor-readable code may be stored and executed in a distributed manner.

Although the preferred embodiments of the present disclosure have been illustrated and described with reference to a number of illustrative embodiments thereof, numerous other modifications and embodiments may be devised by those skilled in the art that will fall within the scope of the principles of this disclosure. The modifications should not be individually interpreted from the technical spirit or the prospect of the present invention.

The present disclosure has described both the article invention and the method invention and may complementally apply the descriptions of the two inventions, if necessary.

INDUSTRIAL APPLICABILITY

Although a RRC connection method in a wireless communication system according to the present invention has been described with reference to examples applied to 3GPP LTE/LTE-A, it is also applicable to various wireless communication systems other than the 3GPP LTE/LTE-A.

The invention claimed is:

1. A method for performing, by a user equipment (UE), a random access in a wireless communication system, the method comprising:
    selecting a specific preamble from a specific preamble set included in a plurality of preamble sets;
    repeatedly transmitting the specific preamble to a base station until receiving a response message as response to the specific preamble,
    wherein the selected specific preamble is received through one beam or a plurality of different neighboring beams of the base station; and
    receiving from the base station the response message including a temporary identifier of the UE as the response to the specific preamble,
    wherein the plurality of the preamble sets are configured based on (i) a number of beams of the base station through which the selected specific preamble is received and (ii) a number of subframes on which the specific preamble is transmitted,
    wherein based on that (i) the number of beams of the base station is one and (ii) the number of subframes is one or more:
    the plurality of preamble sets includes preamble sets each configured differently based on the number of subframes,
    wherein based on that (i) the number of beams of the base station is greater than one and (ii) the number of subframes is greater than one:
    the plurality of preamble sets includes preamble sets each configured differently based on a total number of repeated transmissions of the specific preamble, and
    wherein based on that (i) the number of beams of the base station is greater than one and (ii) the number of subframes is one:
    the plurality of preamble sets includes preamble sets each configured differently based on (i) the number of beams of the base station and (ii) an index of a beam of the base station that starts a reception of a repeated transmission of the specific preamble, and
    in case of the number of beams of the base station is a specific number, different preamble sets are configured for each index of a beam of the base station that starts the reception of the repeated transmission of the specific preamble.

2. The method of claim 1, further comprising:
    receiving from the base station a synchronization signal for downlink synchronization;
    obtaining combinations of beams available by the UE based on the synchronization signal;
    selecting a specific combination of beams among the available combinations of beams; and
    acquiring the downlink synchronization of the base station using the selected combination of beams.

3. The method of claim 2, further comprising:
receiving from the base station resource information for the random access,
wherein the resource information includes at least one of OFDM symbol information and subframe information that are mapped to a beam for the base station to receive a signal, frequency resource information, preamble information indicating the plurality of preamble sets, and scheme information indicating a combination scheme of beams for the transmitting of the specific preamble.

4. The method of claim 3, further comprising:
selecting the one beam or the plurality of different neighboring beams for transmitting the specific preamble among the available combinations of beams.

5. The method of claim 4, wherein when the base station uses a two-dimensional (2D) beam, the one beam or the plurality of different neighboring beams are selected only in an azimuth angle direction or an elevation angle direction based on the scheme information.

6. A user equipment (UE) performing a random access in a wireless communication system, the UE comprising:
a communication unit configured to transmit and receive a radio signal; and
a processor functionally coupled to the communication unit,
wherein the processor is configured to:
select a specific preamble from a specific preamble set included in a plurality of preamble sets;
repeatedly transmit the specific preamble to a base station until receiving a response message as response to the specific preamble,
wherein the selected specific preamble is received through one beam or a plurality of different neighboring beams of the base station; and
receive from the base station the response message including a temporary identifier of the UE as the response to the specific preamble,
wherein the plurality of the preamble sets are configured based on (i) a number of beams of the base station through which the selected specific preamble is received and (ii) a number of subframes on which the specific preamble is transmitted,
wherein based on that (i) the number of beams of the base station is one and (ii) the number of subframes is one or more:
the plurality of preamble sets includes preamble sets each configured differently based on the number of subframes,
wherein based on that (i) the number of beams of the base station is greater than one and (ii) the number of subframes is greater than one:
the plurality of preamble sets includes preamble sets each configured differently based on a total number of repeated transmissions of the specific preamble, and
wherein based on that (i) the number of beams of the base station is greater than one and (ii) the number of subframes is one:
the plurality of preamble sets includes preamble sets each configured differently based on (i) the number of beams of the base station and (ii) an index of a beam of the base station that starts a reception of a repeated transmission of the specific preamble, and
in case of the number of beams of the base station is a specific number, different preamble sets are configured for each index of a beam of the base station that starts the reception of the repeated transmission of the specific preamble.

7. The UE of claim 6, wherein the processor is configured to:
receive from the base station a synchronization signal for downlink synchronization;
obtain combinations of beams available by the UE based on the synchronization signal;
select a specific combination of beams among the available combinations of beams; and
acquire the downlink synchronization of the base station using the selected combination of beams.

8. The UE of claim 7, wherein the processor is configured to receive from the base station resource information for the random access,
wherein the resource information includes at least one of OFDM symbol information and subframe information that are mapped to a beam for the base station to receive a signal, frequency resource information, preamble information indicating the plurality of preamble sets, and scheme information indicating a combination scheme of beams for the transmitting of the specific preamble.

9. The UE of claim 8, wherein the processor is configured to select the one beam or the plurality of different neighboring beams for transmitting the specific preamble among the available combinations of beams.

10. The UE of claim 7, wherein when the base station uses a two-dimensional (2D) beam, the one beam or the plurality of different neighboring beams are selected only in an azimuth angle direction or an elevation angle direction based on the scheme information.

* * * * *